Feb. 28, 1967  J. G. LEWIS ETAL  3,306,764
METHOD FOR FORMING A REFRACTORY METAL OR CARBIDE
COATING ON REFRACTORY MATERIALS AND ARTICLE
Filed Aug. 19, 1959  3 Sheets-Sheet 1
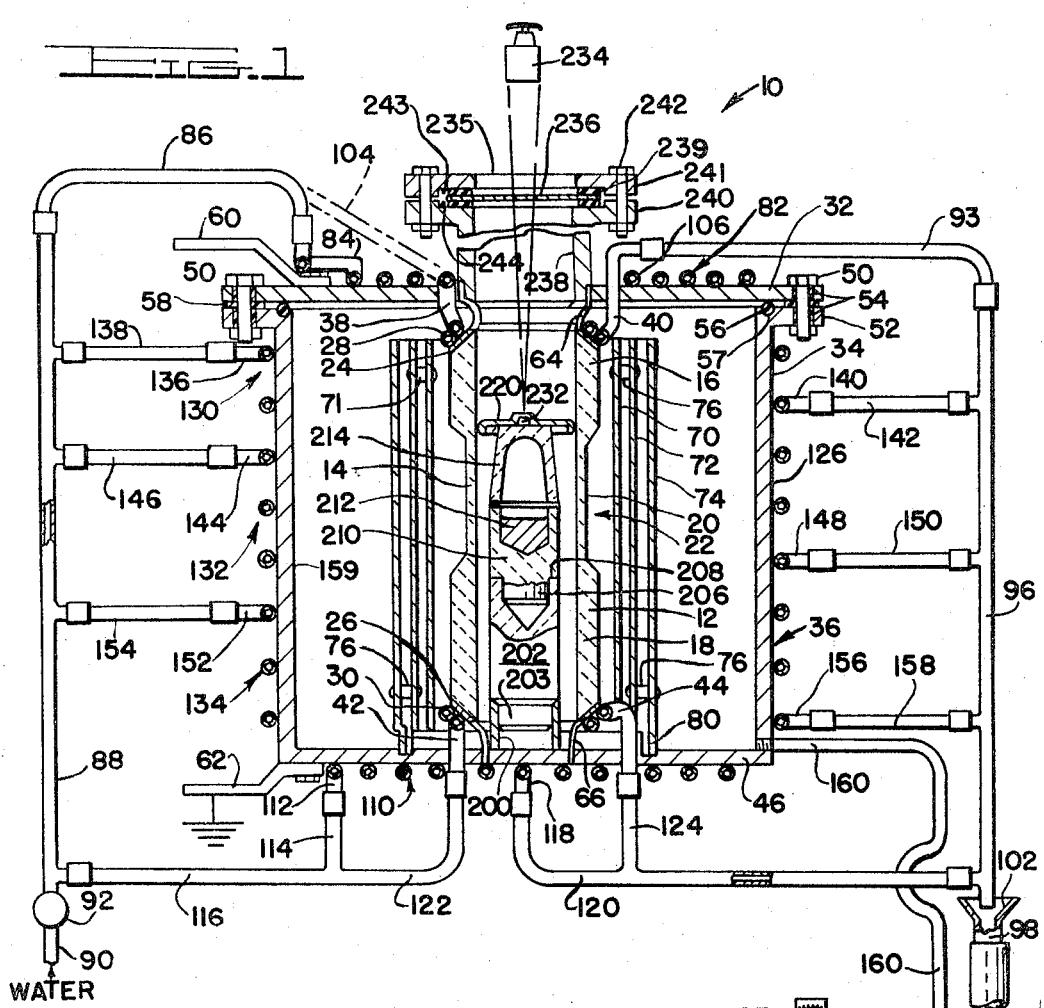
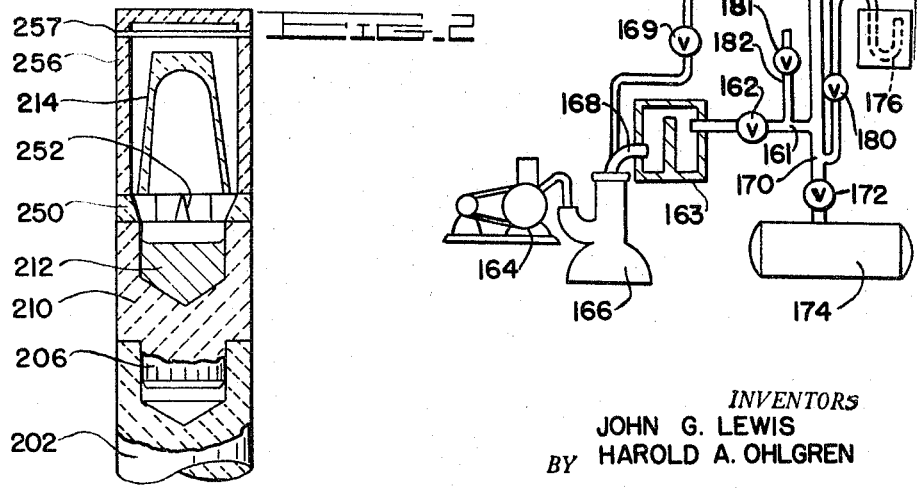
INVENTORS
JOHN G. LEWIS
HAROLD A. OHLGREN
BY
FINN G. OLSEN
ATTORNEY

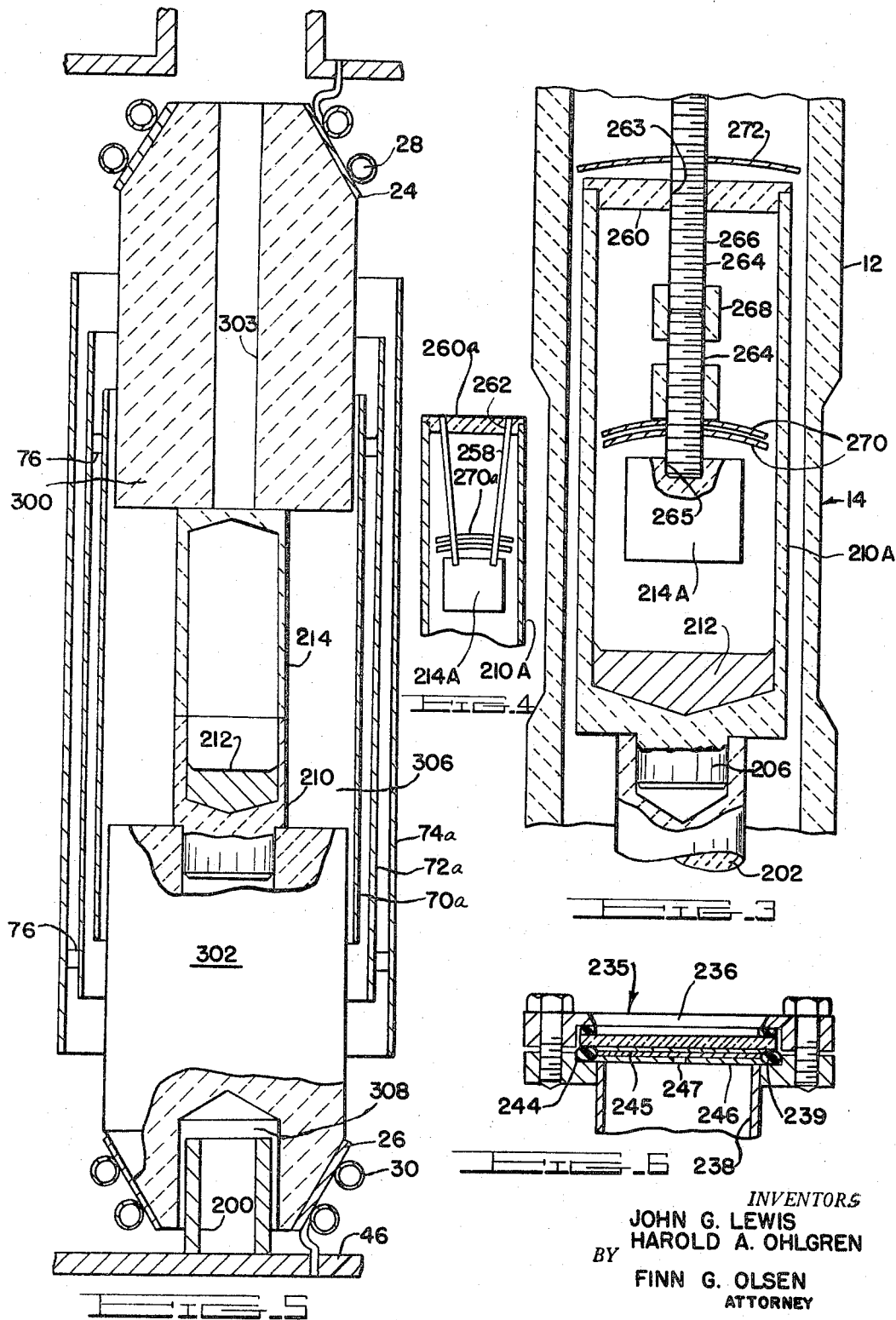

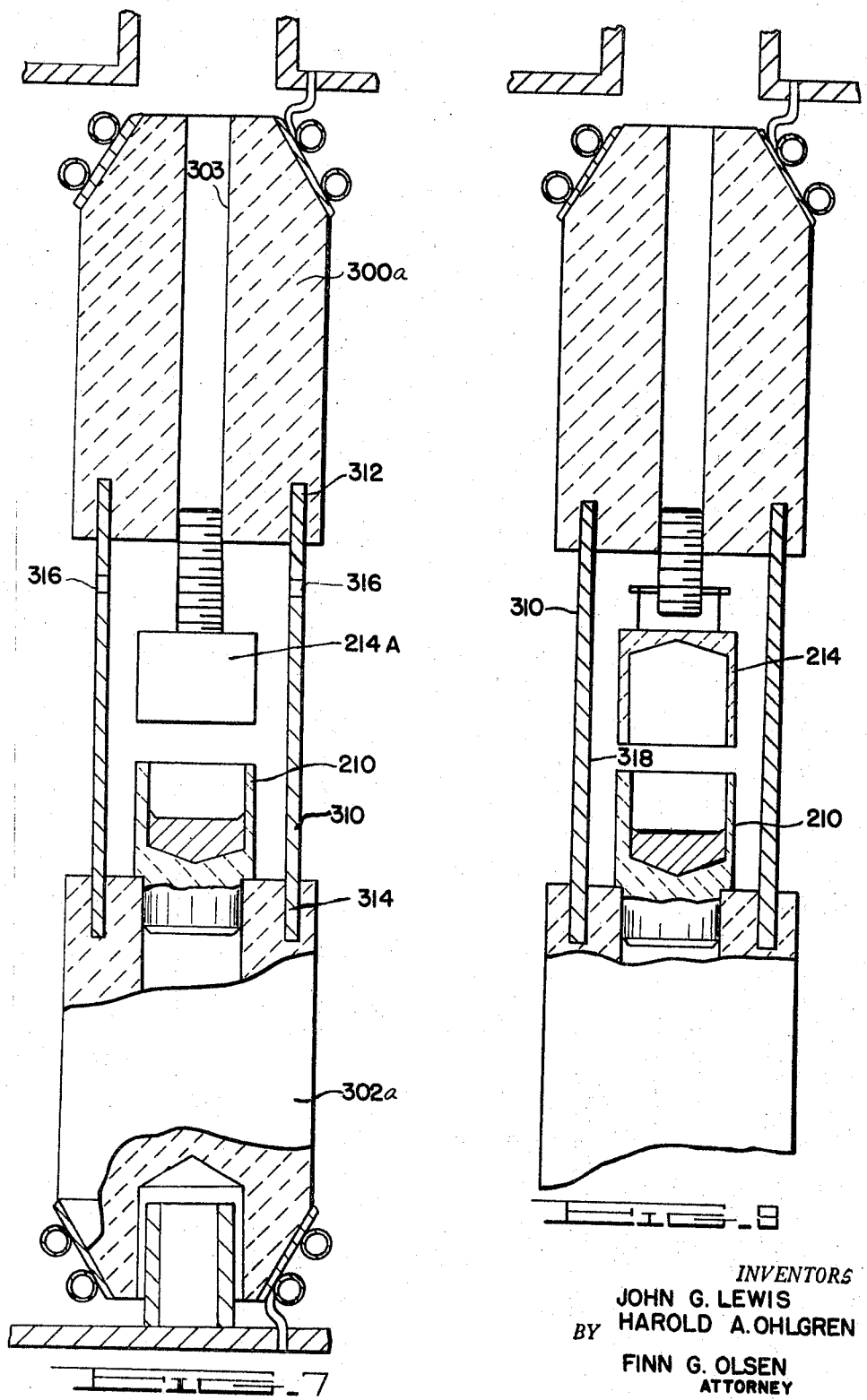

3,306,764
METHOD FOR FORMING A REFRACTORY METAL OR CARBIDE COATING ON REFRACTORY MATERIALS AND ARTICLE
John G. Lewis and Harold A. Ohlgren, Ann Arbor, Mich., assignors, by mesne assignments, to Nuclear Technical Service Corporation, Ann Arbor, Mich., a corporation of Michigan
Filed Aug. 19, 1959, Ser. No. 834,686
33 Claims. (Cl. 117—61)

This invention relates to methods for treating or processing base materials with the thermally produced vapors of metals and intermetallic compounds or alloys which are capable of imparting predetermined physical and/or chemical properties to part or all of such base materials. It also concerns the treated base materials and/or structures thereof.

The present invention especially deals with such methods, apparatus, materials and structures whereby the treated base material has part or all of its exposed or exterior surfaces and/or interstitial portions provided with thermodynamically stable metallic barriers which may be coatings or layers of predetermined depth or thickness which barriers are resistant to diffusion therethrough by other molten metals, compounds and gases and which barriers may afford physical protection to the base material as well as high temperature erosion, corrosion, and/or chemical resistance.

A particular feature of this invention is the formation of such stable barriers by steps essentially comprising a controlled temperature-time and pressure relationship to which the base material and barrier forming metallic component are subjected whereby vapors of the metallic component are caused to substantially simultaneously diffuse and chemically react with stoichiometric quantities of the base material to form chemically combined products, solutions and/or mixtures of the barrier producing components or elements.

Another particular feature of this invention is concerned with the formation of carbides of metals of relatively high boiling point by diffusion at a controlled rate of vapors of such metals into base structures composed of allotropic forms of carbon.

Thus, it is possible according to this invention to process base structures so that diffusion resistant and chemically resistant barriers result. Moreover, depending upon the application and use of the end products it is possible to provide barriers which obtain uniform penetration and controlled compositions and possess unusual high temperature properties, erosion resistance, high mechanical strength, imperviousness to many substances and gases and resistance to thermal shock.

The deposition of metallic films by heating in vacuo has been known with reference to certain low boiling point metals for specific decorative applications. Thus, it has been known to effect vacuum coating of glass mirrors and similar objects by the vapor deposition of aluminum, zinc, gold and silver and to obtain the vapor deposition of alkali metals for use in photo tubes. It is also proposed to obtain protective barriers or layers of carbides of refractory metals on base objects by the reduction of volatile halides. Moreover, it has been proposed to cast uranium in a graphite mold or crucible from an impure ingot in order to obtain pure uranium and in the course of which operation a skin of impurities comprising uranium carbide is formed at the interface between the cast uranium and the graphite receptacle. It has likewise been suggested that carbides of certain metals may be formed by heating a powdered mixture of carbon and oxides of the combining metal.

The present invention is to be distinguished from the foregoing known or alleged procedures in a number of important aspects.

According to the present invention, objects may be treated with or have deposited thereon relatively dense vapors of a metal in a manner to form a substantial diffusion controlled concentration gradient of the barrier material. Moreover, it is possible to accomplish this result with metals of relatively high boiling point (i.e., metals whose vapor pressure is less than ten microns of mercury at about 2000° F.). Known processes have only been successful with low boiling point metals such as zinc, aluminum, silver and gold and by utilizing heating filaments such as tungsten upon which small strips of the metal are hung. Furthermore, by the present invention the objects to be treated or coated are heated to predetermined temperatures to effect distribution of the deposited metal and/or product with uniformity of penetration and diffusion into the structure. The known vapor processes aforesaid deposited their metal upon cold or relatively cool surfaces.

The present invention is also particularly adapted for improving the physical and chemical properties of structures composed of allotropic carbon. Graphite, for example, has relatively low strength at room temperature but retains that strength essentially undiminished to temperatures so extreme that most other materials have much lower strengths by comparison. Hence carbon would, but for its ease of chemical reaction at relatively moderate temperatures resulting in some instances in mechanical failure of the graphite or the chemical contamination of its environment or contents, be a desirable high temperature material of construction for many applications. For instance, carbon containers react rapidly with quantities of the contained metals causing contamination of the metals and destructive corrosion of the carbon container. They also react rapidly with oxygen and other gases commonly associated with metallurgical procedures, at relatively low temperatures, causing contamination of the gases, and thus, potential contamination of the metals and also destructive corrosion of the carbon.

In arriving at the present invention, it has been discovered that it is possible to diffuse effectively the vapors of metals used in this invention into heated carbon structures of various allotropic forms and effect a reaction of the metal vapor with the carbon to form barriers of carbides of the metal with the carbon at the surface and in the interstices which will materially enhance the physical and chemical properties of the carbon structure. By proper restriction of flow of the metal vapor and heating of the object to be coated to cause reaction and redistribution of the metal, a substantially uniform barrier is also obtainable. Moreover, where the structures are porous as in the case of graphite crucibles, for example, it is feasible to effect diffusion and reaction for a sufficient time to obtain a complete film or coating of predetermined depth or thickness whereby all the pores or other avenues of contact with the underlying carbon are completely closed or sealed off by a carbiding of the metal after which continued vapor deposit may produce an overlay essentially of pure metal. In all events, the films or coatings of metal or metal carbides are strongly bonded and adherent to the base material.

It has been observed that allotropic forms of carbon into which vapors of refractory metals and/or intermetallic compounds or alloys have been diffused in accordance with the present invention exhibit a controlled penetration of the metal and/or resultant metal carbide to considerable depths below the original surface of the carbon structure. Decreasing concentrations of metal or metal carbides are observed as one proceeds from the original surface into the graphite structure, that is to say, the metal or metal carbide impregnation is more concentrated adjacent the surface than it is inwardly of the surface, as desired.

The temperature-time-pressure relationship under which the metal vapor is caused to diffuse and react into the carbon base structure influences the chemical composition, grain structure, solid solution formation and depth of penetration of the metal or carbide coating.

By control of such variables as rates of metal volatilization, time of operation, temperature and temperature gradients over predetermined limits of pressure ratios there becomes established certain maximum and minimum limits of variables that influence diffusion rates, mechanisms of chemical reactions, reaction rate constants and composition of final structure. The rate of metal vapor diffusion is dependent upon diffusion coefficients and temperature functions which can be expressed in general as $$D(T) \nabla^2 C + G = \alpha c / \alpha t$$

where $D(T)$ = diffusion coefficient, which is a function of temperature T.

$T$ = temperature in degrees K.

$G$ = a term representing a source of diffusing metal of interest. It is a function of temperature, time, position, and the chemical and physical characteristics of the system.

$\alpha c / \alpha t$ = time rate of change of concentration gradient $t$ = time elapsed since start of diffusion $c$ = concentration of diffusing metal, moles per unit volume The chemical reaction can be expressed as $$xM + yS \rightarrow M_x S_y$$

where $M$ = chemical symbol for metal vapor $S$ = chemical symbol for structure reacting with metal $x$ = moles of metal chemically equivalent to $y$ moles of structure The reaction rate as a function of a first order equation is thought to be $$R = k(T) \cdot C$$

$R$ = moles of metal reacted per unit time per unit volume $k(T)$ = reaction rate constant, a function of temperature, units of reciprocal time $C$ = molal concentration of reacting metal It is to be noted that by this invention it is possible to obtain adequate and continuous diffusion and transition of the metal through the initial carbide formation and effect a penetration gradient providing a satisfactory bond and predetermined depth of metal carbide formation.

It has also been found that the origin, kind and properties of the carbon base material employed in applying the methods of this invention has some bearing on the character of bond obtained. Thus, when commercially available carbons are used that contain quantities of impurities, such as hydrocarbons, such may release gases at the high temperatures employed in this invention and may be responsible for partial separation of the barrier layer from the base carbon or weakening of the bond therebetween. It is therefore preferred to employ an ultra pure graphite form of carbon such as the spectrographic electrode grade of graphite, or to remove gases before applying the treatment.

A further important aspect of this invention is the proper selection of the carbide forming metal. Thus, while all the metals preferably used in this invention form refractory carbides improving the low temperature mechanical strength of carbon structures of which they are an integral part and provide resistance to certain types of chemical attack thus fortifying the inherent resistance of carbon structures to temperature and/or thermal cycling and/or shock, the use of certain of such metals will also provide the carbon structure with diffusion resistant barriers that will mitigate or substantially eliminate corrosive or chemical attack of the carbon by metals or gases having this effect, the metal employed forming a carbide relatively stable to chemical reaction by agents normally corrosive to carbon.

For example, a transition metal may be chosen whose carbide is extremely refractory, resists certain types of corrosion and certain ranges of temperature much better than either the carbide forming metal or graphite, will have particular advantage in handling molten metals such as molten uranium since the carbide will not react with or dissolve in the molten metal. Moreover, carbon structures such as carbon crucibles or ladles treated with such a transition metal may be used in or on molten metals such as uranium or less active metals without incurring contamination of the metal.

The present invention also minimizes the introduction of impurities into the deposited metal or carbide thereof by permitting the use of the metal itself or an intermetallic compound rather than their halides or oxides and by conducting the deposition process in vacuo and/or in an inert gaseous atmosphere rather than in a mixture of hydrogen and/or hydrocarbon and vaporized halide. The process of this invention facilitates outgassing during heating thereby to help remove volatile substances from the base structure or object being treated and from the deposition layer and such further minimizes contamination of the bonded carbide coating layer.

It is therefore a principal object of the present invention to treat a base material with a thermally produced vapor of a relatively high boiling point refractory metal or intermetallic compound or alloy.

Another object of this invention is to provide a base structure with a barrier layer of a refractory metal or intermetallic compound whose boiling point at a pressure of less than 10 microns of mercury is above about 2000° F.

A particular object is to provide base structures with a thermodynamically stable metallic barrier of predetermined depth resistant to diffusion therethrough of molten metals, compounds and gases and which will afford physical protection to the base structure as well as high temperature corrosion, erosion and/or chemical resistance.

Another particular object is to produce stable barriers as in the preceding objects by subjecting a base material and barrier forming material to a controlled temperature-time-pressure relationship whereby the metal vapors substantially simultaneously diffuse and combine with stoichiometric quantities of base material for instance substantially pure allotropic carbon to form chemically combined products, solutions and/or mixtures of the barrier producing elements.

A further object is to effect diffusion of a vapor of a relatively high boiling point metal or intermetallic compound in or on a base material in a manner to produce a strongly adherent substantially pure metal coating thereon and which may be of a substantially uniform thickness.

An additional object is to diffuse and bond the surface or joints of objects of a refractory character with a layer or film of the carbide of a metal or intermetallic compound having a high boiling point.

Another object is to provide structures as set forth in the preceding objects wherein the bonded barrier which may be a layer or film will be characterized by corrosion resistance, high temperature resistance and the ability to become a diffusion barrier to other metals.

Still another object is to provide a process for securing the diffusion and bonding of refractory metals of relatively high boiling point with refractory objects and effecting said bond by a chemical reaction between the metal and the object to form a carbide having a predetermined penetration gradient.

A specific object is to provide refractory structures composed essentially of allotropic forms of carbon with a relatively pure metallic surfacing comprising a carbide of a metal of relatively high boiling point which surfacing is the reaction product of a vapor of the pure metal with the carbon.

A further object is to provide structures as in the preceding object with a continuous bonded metallic layer of a carbide with an overlay essentially of the metal forming the carbide.

An additional object is to provide refractory material with a refractory metal layer of exceptional high purity and substantial adhesion and luster and which will add substantial mechanical strength to such objects.

Another specific object is to provide graphite crucibles and other forms of structure composed essentially of allotropic forms of carbon with a strongly adherent substantially hard, continuous and substantially completely sealing surface of a stable carbide of a relatively high boiling point metal or intermetallic compound which carbide surfacing is capable of inhibiting contamination of the base refractory material with molten metals of lower chemical affinity with which the surfaces of said crucibles and like structures come in contact and which carbide surfacing will itself not contaminate such molten metals.

Another specific object is to provide a process comprising diffusing the vapor of a metal of relatively high boiling point at a controlled rate over a heated refractory base material composed essentially of an allotropic form of carbon to effect a reaction and bond therewith.

A further specific object is to provide a process comprising diffusing the vapor of a refractory metal of relatively high boiling point over a refractory base material to form an intimately bonded metallic layer thereon having a predetermined penetration gradient.

Still another object is to provide a process of diffusing in vacuo vapors of relatively high boiling point metals into refractory materials and while avoiding contaminating residues of a corrosive character.

It is also an object to provide a process as in the preceding objects wherein the diffusion takes place in the presence of an inert gas at a pressure less than the vapor pressure of the metal.

It is an object of this invention to provide for the making of metal carbide articles and to provide for the coating of such articles with boron nitride, silicon, silicon oxide, a carbonitride, or a oxycarbonitride.

Another object is to provide novel forms of apparatus for effecting the preceding objects.

Other objects and advantages of this invention will be evident from the following description and from the drawings illustrating without limitation the invention as applied to graphite crucibles for handling molten metals.

In the drawings:

FIGURE 1 is a schematic arrangement of a preferred form of the apparatus of this invention, certain elements being shown in section and for purposes of clarity of greater dimensional size than others;

FIGURE 2 is an enlarged view of a modification of the charge carrying structure of FIGURE 1 adapted for effecting diffusion of the melt metal into inner and outer surfaces of the object to be treated;

FIGURE 3 is an enlarged cross sectional view of a further modification of an arrangement for obtaining complete coating of the object to be treated;

FIGURE 4 illustrates still another arrangement for obtaining complete coating of an object;

FIGURE 5 is an additional modification of the apparatus in FIGURE 1 showing an arrangement wherein the metal and its crucible form part of the power conducting circuit;

FIGURE 6 is a cross sectional view of a modification of the sight window of FIGURE 1; and FIGURES 7 and 8 are further modifications wherein the heating tube forms a containment vessel for the metal vapors.

In practicing the present invention it has also been discovered that although similar techniques are employable in working with the different metals thereof, the specific treatment essential to obtaining the coated structures will depend upon the specific metal used and that certain metals provide the base structure with especially significant properties which are important features of this invention.

For example, as noted above, structures made of forms of allotropic carbon, such as graphite, are subject to corrosion by many metals and gases with which they come in contact. One aspect of this invention is therefore to provide the carbon surface of these structures with protection against this condition by means of a diffusion barrier of metal or carbide of the metal preferably the latter. The metal or carbide to be effective in such instances must be more inert than the carbon alone to chemical or physical attack and failure, and preferably will be relatively stable to chemical action by agents normally corrosive to carbon. Moreover, the metal and its carbide form will also preferably be more stable chemically than the carbides of the metals which it is desired to contain or with which the coating is to have contact. In the latter connection, it has been found that the relative stabilities of carbides of the metals of this invention may change with temperature so that a carbide diffusion barrier resistant to attack by a specific substance or substances at one temperature may become thermodynamically subject to attack if the temperature is changed. It has also been found that a good basis for predicting chemical stability of diffusion barriers of the metals and carbides thereof employed in this invention relative to carbon, that is to say, the affinity of these metals or carbides for carbon, is to compare the free energies of formation of the various carbides at 298° K. assuming constancy of $\Delta Hf°$ and $\Delta Sf°$ with temperature. The approximate order of chemical stability beginning with the most stable is as follows:

78° F.:

| | | |
|---|---|---|
| TiC | VC | $Cr_7C_3$ |
| UC | $ThC_2$ | SiC |
| TaC | $U_2C_3$ | $Cr_3C_2$ |
| $Ta_2C$ | $UC_2$ | $Mo_2C$, MoC, |
| ZrC | $Cr_{23}C_6$ | WC |
| NbC | $W_2C$ | $Fe_3C$ |

2000° F.:

| | | |
|---|---|---|
| TiC | NbC, $U_2C_3$ | $Cr_3C_2$ |
| UC | VC | SiC |
| $Ta_2C$ | $UC_2$ | $Mo_2C$, MoC, |
| TaC | $W_2C$ | WC |
| $ThC_2$ | $Cr_{23}C_6$ | $Fe_3C$ |
| ZrC | $Cr_7C_3$ | |

3000° F.:

| | | |
|---|---|---|
| TiC | NbC | $Cr_3C_2$ |
| UC | VC | $Mo_2C$, MoC, |
| $Ta_2C$, $ThC_2$ | $W_2C$, $VC_2$ | WC, SiC |
| TaC | $Cr_{23}C_6$ | $Fe_3C$ |
| ZrC, $U_2C_3$ | $Cr_7C_3$ | |

As will be evident from this table, the more stable carbides and the most suitable for use in diffusion resistant barriers are probably titanium, uranium, tantalum, zirconium, niobium, vanadium, and thorium. It will be understood that this list is not intended to be exact as will be evident from the shifts in relative position evident in the table due to temperature. Moreover, physical solubility conditions of concentration, departure from ideality or removal of products or reactants could result in reactions occurring which would not necessarily follow this order of stability. Although they are not included in the above list, it is quite likely from chemical considerations that the carbides of hafnium (Hf) also exhibit comparable stability and would probably follow niobium (Nb) in the list.

The metals of the preferred carbides generally comprise the transition elements of Group IV–A and Group V–A of the Periodic Table. Silicon is in Group IV–B (as is carbon) while thorium (Th) and uranium are both generally included in the actinide series, and while having special properties, could be considered to be in Groups IV–A and VI–A respectively. It is also possible that based upon chemical similarity, cerium (Ce), praseodymium (Pr), and neodymium (Nd) might exhibit properties similar to uranium and thorium.

Of the foregoing carbides, those which offer the greatest possibilities as diffusion resistant coatings on allotropic forms of carbon are titanium carbide, uranium carbide and tantalum carbide. Titanium carbide diffusion barriers will contain melts or vapors of other metals and appear to be more stable than uranium carbide up to temperatures in the range of 2500° F. The substantial stability of uranium carbide suggests its use as a diffusion barrier under some conditions with containers for other metals. Zirconium carbide (ZrC) resists uranium attack and so also does tantalum carbide.

It may be noted that coupled with uncertainties in thermochemical criteria of stability are questions of rates of attack of carbide diffusion barriers by metals which may have carbides more or less stable than those of the diffusion barrier. That is to say, effects comparable to passivation may occur and inhibit further attack. In addition, the relatively smooth, hard, impervious character of diffusion barriers applied to allotropic forms of carbon by the methods of this invention may present surfaces of reduced area and of sufficient regularity as to greatly reduced rates of attack or diffusion of metals into carbon objects so treated, whether the diffusion barrier is more stable chemically than the carbides of the melt or not.

From the standpoint of relative stability and resistance to attack by molten metals, diffusion barriers including carbides of vanadium, titanium, uranium, tantalum, zirconium, niobium, hafnium, and thorium may be useful in containing melts of ferrous metals, copper alloys, aluminum alloys and the like.

Furthermore, the carbides of titanium, tantalum, zirconium, niobium, hafnium and vanadium are considered to be suitable chemically as diffusion barriers for the containment of uranium and/or its alloys.

Since some of these metals are more readily applied to forms of allotropic carbon as diffusion barriers than others, the metal titanium is preferred for that reason and because it forms one of the most stable carbides and is also reasonable in cost. From the standpoint of application which favors the use of the more volatile metals, the volatilities of the above metals based upon our observations are as follows, listing them in order of decreasing vapor pressure at a given temperature: silicon, titanium, zirconium, vanadium or uranium, thorium, niobium, hafnium and tantalum. This listing will serve as a further guide for selection of the metal to use in a given application.

The application of any of the foregoing metals or metals having properties perhaps similar to those referred to above, such as chromium, boron, molybdenum and tungsten, by means of vaporizing and condensing these metals upon forms of allotropic carbon such as graphite encounters as a consideration the attainment and maintenance of adequately high temperatures of both metal and structure under controlled conditions to cause vaporization of the metals at rates great enough to be economically attractive. Such rates will be those giving several mils of metal deposition over objects of at least several square inches of surface area in an elapsed time of the order of one to ten minutes. Such metal transfer rates by vaporization are found to require vapor pressures of 100 microns or greater. However, there appears to be little advantage for applying carbide layers from coatings in exceeding about 10,000 microns of vapor pressure. Below 100 microns, deposition rates are found to be unattractively low from a practical standpoint, and above 10,000 microns vapor pressure deposition rates may become so great as to cause "piling up" of the deposited metal upon the object with condensed metal actually running down the sides of the object in little streams dropping off at the bottom of the object or building up excessive thicknesses or rough coatings in regions of the coated objects subject to flow restrictions or reduced temperatures during coating. The existence of running streams of metal condensate and dropping of metal can be recognized in some cases from the erosion caused in the carbon object resembling closely the appearance of ravines eroded on the surface of the earth by natural waters, and terminating often at geometrical irregularities, in congealed droplets of metal and/or carbide. The slower deposition of the coating is preferred since it also allows more time for diffusion and interaction of the metal with the carbide base material thus giving a better bond.

The following examples will serve as a guide of the results obtainable with some of the above metals:

A. At 100 microns vapor pressure (about 3500° F.) titanium will vaporize at about $9 \times 10^{-4}$ grams per second per square centimeter of hot metal area. At 10,000 microns vapor pressure (about 4500° F.) titanium will vaporize at about $8 \times 10^{-2}$ grams per second per square centimeter of hot metal area.

About 0.012 gram of titanium is needed on a surface of one square centimeter to provide a coating of about one mil (0.001″) thick. Thus if an object of 10 square inches is to be given a 10 mil coat from a vaporizer having 2 square centimeters of exposed hot metal, such will require deposition of 7.5 grams of metal.

At 100 microns vapor pressure and allowing for revaporization of 50% of the initial deposit to obtain a substantially uniform layer, the amount of time required for coating will be about 8400 seconds or about 2¼ hours. If all other conditions are the same and the vapor pressure is increased to 10,000 microns, the time required for securing the above coating will be about 95 seconds or 1½ minutes.

It will be understood that longer times will be required where operation is carried on with non-uniform temperatures or where there is a loss of metal during processing.

B. Assuming the same conditions as in the preceding example except temperature and using zirconium instead of titanium, the coating time will be about 2½ hours at 100 microns vapor pressure (about 4000° F.) and about 1½ minutes at 10,000 microns vapor pressure (about 5000° F.).

With the above in mind and based upon experience with numerous operations, the times required for the application of other coatings will vary from the foregoing approximately as follows:

(1) Substantially directly with the thickness of coating required.

(2) Substantially directly with the area to be covered.

(3) Substantially inversely with the area from which metal is being supplied by evaporation.

(4) Substantially directly with the density of the metal.

(5) Substantially inversely with the vapor pressure of the metal at the temperature of the vaporizer less the vapor pressure of the metal at the temperature of the work being coated. This is a rough value. The actual net deposition will occur somewhat more rapidly than (5) states.

(6) Substantially inversely with some function of the molecular weight of the metal being evaporated, as this affects rate of vaporization.

As a further guide in operating with the metals of this invention, the following temperature limits may be used for the materials indicated using as a basis vapor pressures between 100 microns and 10,000 microns:

| Material | Temperature, Degrees F. at 100 microns vapor pressure | Temperature, Degrees F. at 10,000 microns vapor pressure |
| --- | --- | --- |
| Chromium | 2,500 | 3,200 |
| Boron | 2,700 | 3,400 |
| Iron | 3,000 | 3,900 |
| Silicon | 3,200 | 3,900 |
| Titanium | 3,500 | 4,400 |
| Zirconium | 4,000 | 5,000 |
| Vanadium | 4,300 | 5,300 |
| Uranium | 4,300 | 5,300 |
| Thorium | 4,900 | 6,000 |
| Molybdenum | 5,500 | 6,900 |
| Hafnium | 5,700 | 7,100 |
| Niobium | 6,100 | 7,100 |
| Tungsten | 6,900 | 8,000 |
| Tantalum | 7,200 | 8,300 |

Describing now in general terms the process of this invention according to one method, the object to be coated or bonded is placed in a region or chamber which can be evacuated. Next the metal to be diffused into and upon the object is placed in or near the object, preferably so that the vapor of the metal is confined to the vicinity of the object to be coated. This can be done for example by making a closed space as by loosely fitting closures of the metal container, metal and object to be treated. This procedure permits a buildup of pressure of metal vapor approaching saturation at the temperatures used, thus, permitting condensation and revaporization to occur during processing. Such is desirable for obtaining uniform coatings.

The regions or chamber in which the object and metal are located is then evacuated to an absolute pressure in the range of 0.01 to 10 microns of mercury. Next, both object and metal are heated by suitable means, for example, an electric furnace, to an elevated temperature and sufficient time is allowed for outgassing all volatile substances from the object and the metal which would tend to contaminate the final product. Heating of the metal and object is then continued at the outgassing temperature or if such temperature is not high enough at a temperature which is sufficiently high that the vapor pressure of the metal is substantially greater than the absolute pressure of the containing region. The object and metal are then maintained at this latter temperature sufficiently long to apply a penetrating covering, coating or layer of desired character and thickness to the object which bonds itself securely thereto.

To obtain rapid deposition of uniform coatings comprising essentially carbides of the metal vaporized, it is important that the flow of metal vapor from the melt be restricted as suggested above and that the object be heated to cause reaction (where the nature of the surface permits) and redistribution of the metal revaporized. Unless the escape of the metal vapor is throttled, the metal vapor will remain superheated upon vaporization and although such will deposit coatings upon objects irrespective of composition and at temperatures even below that of the metal, including room temperature, the vapors will be tenuous and the coating unpredictable.

When the object to be treated has a surface of an allotropic form of carbon, a reaction will take place between the diffused metal and the carbon such that the formed layer will be constituted of a carbide of the diffused metal. This carbide will be produced so long as there is any carbon available in or through the surface heated to effect the reaction. Thereafter the surfacing will usually be that of the diffused metal only. The change from carbide to pure metal may be recognized by a difference in luster or color, the carbide being a duller hue than the pure metal. The temperature-time-pressure relationship under which the metal vapor was diffused will determine the composition grain, structure, solid solution formation and depth of penetration of the metal carbide. The penetration will be according to a density gradient with the greatest metal carbide concentration at the surface.

When the base material is a high temperature ceramic material or a refractory metal capable of withstanding the high temperatures of the process, the diffused coating may be that of the pure metal only and it will bond itself to the base material to form a hard and tough layer.

When an adequate coating or layer has been obtained as aforesaid, the entire assembly is cooled under vacuum to a substantially non-reactive temperature, after which the vacuum may be broken and the coated object removed.

A form of apparatus by which the process of this invention may be preferably carried out is shown in the drawings where similar numerals have reference to corresponding parts of the structure.

Referring especially to FIGURE 1, the numeral 10 generally refers to an electrical resistance furnace comprising a central tubular resistance element 12, such as a cylindrical graphite pipe which has a central longitudinal portion 14 between its ends 16, 18 formed, as by turning, with a wall 20 of reduced thickness to provide a preferred electrical resistance heating zone or path generally designated by the numeral 22 which is preferably of high resistance. The tubular resistance element 12 will also function to a limited extent as a heat radiation shield with respect to items within its walls.

The ends 16 and 18 of the resistance element 12 are preferably tapered and fit into contact with metallic conducting collars 24, 26 preferably of brass, which in turn nest in and are welded, silver soldered or brazed to the conically spirally wound spring coils 28, 30 which are constituted of tubular metal elements, the opposite ends of which extend through the cover 32 and casing 34 respectively of the metal housing 36, as shown, and are secured as by welding, silver soldering or brazing thereto to provide a rigid support for the coils. Thus the ends 38, 40 of the coil 28 extend through and are secured to the cover 32 and the ends 42, 44 of the coil 30 extend through and are secured to the wall 46 of the casing 34.

The coils 28 and 30 preferably have sufficient resilience to permit the resistance element 12 to be releasably held between the collars 24, 26 with good electrical contact being maintained between these parts and between the collars 24, 26 and the coils 28, 30, which in turn have good electrical contact with the cover 32 and casing 34 respectively. The helical coils 28 and 30 not only serve as supports or spring mountings and electrical conductors for the element 12 but also preferably act as liquid coolant conductors in heat exchange relationship with the collars 24, 26 for cooling the collars 24, 26 as hereinafter described.

The cover 32 is suitably secured as by cap screws 50 to a flange portion 52 of the casing 34. These cap screws 50 are suitably insulated as by plastic tubes 54 which may be of "Tygon" insulation, from the metal of the cover. A circular rubber O-ring seal 56 is provided between the cover 32 and flange 52 which is preferably provided with an O-ring groove 57 to provide a gas tight seal. Teflon rings 58 may be placed inside or outside of the O-ring seal to minimize possibilities of short circuits between cover and casing.

Suitable bus bars 60, 62 or terminals are secured as by welding, silver soldering or bolting to the cover and casing of the housing 36 to bring a high current of low voltage to the element 12. These terminals are in turn, for example, connected to the 10-volt output side of a 208 volt A.C. single phase saturable reactor and isolation transformer (not shown) the high voltage side of which is connected to a source of power. In some cases due to the large current being conducted to the element 12, it may be desirable to provide separate flexible copper conductors 64, 66 between the collar 24 and the cover 32 and between the collar 26 and casing 34 respectively.

Arranged within the casing and suitably surrounding the resistance element 12 in spaced relation thereto are suitable additional radiation shields for reducing heat losses in the critical area 22. Thus, preferably there are provided two or more inner tubular shields 70, 72 of molybdenum or other suitably refractory material of low emissivity concentric with the element 12 surrounded in turn by a concentric stainless steel tubular radiation shield 74. The shields may be connected together by suitable tie bars 76 and secured to the base of the housing 36 in any suitable manner as by screws (not shown) secured through foot extensions 80 of the radiation shields. The outer shield may alternatively rest in a groove cut in the base 46 and be positioned and supported radially by the groove.

In addition to the coils 28, 30 for cooling the ends of the element 12, there are further provided, a plurality of independent copper coils in heat exchange relationship with the cover 32 and casing 34 of the housing and which are secured to the respective parts of the housing preferably by welding or silver soldering. Thus, there is provided a spirally wound copper tube section generally designated by the numeral 82 mounted on the cover 32 of the housing and which has an outer end or coil 84 connected through a plastic tube 86 with a source of liquid coolant such as water from a copper pipe line 88, 90, a suitable control valve 92 being located between the pipe sections 88 and 90 for controlling flow of the liquid coolant. The inner end of the section 82 is preferably connected to the end 38 of the copper coil 28 surrounding the upper end of the element 12, the opposite end 40 of this coil being connected by suitable plastic piping 93, and copper tubing 96, 98 with a drain 100. A funnel 102 is provided below the lower end of the copper tube sections 96 to give visual indication of the outflow of liquid coolant. Thus, it will be seen that liquid coolant entering at 84 will flow through the coils of the section 82 leaving at the inner end thereof and entering the coil 28 at the inlet 38 and flowing through the coil 28 leaving at the outlet 40 thereof and entering the drain section 93. In certain cases it may be desirable to have the liquid coolant directly conducted from the input line 86 to the coil 28 inlet 38. In that event a branch line 104 is provided between the plastic section 86 and the inlet 38 and a discharge outlet section 106 is provided between the inner coil of the section 82 and discharge outlet pipe 40.

A similar heat exchange section generally designated by the numeral 110 may be provided against the base wall 46 of the housing. This section has its outer coil inlet 112 connected by copper tubing 114, 116 with the pipe line 88 to bring liquid coolant to this section. The innermost coil has an outlet 118 which in turn connects by a copper tube conductor 120 with the pipe line 96 and thereby to the drain 100. An extension 122 of the inlet line 116 connects with the end 42 of the lower coil 30 supporting the element 12 to bring liquid coolant to such coil and the outlet extension 44 of the coil 30 is connected by a copper tubular section 124 with the discharge line 120 aforesaid. It will be understood that the section 110 and coil 30 may be interconnected as in the case of the upper coil 28 and section 82 to cause the liquid coolant to first traverse the section 110 and then the coil 30 and pass to the drain 100.

Surrounding the body 126 of the housing 36 are two or more copper coil sections (three being shown) generally designed by the numerals 130, 132 and 134 each mounted as by welding or silver soldering to the body 126 of the housing. The uppermost section has its inlet 136 connected by a copper tube section 138 with the pipe line 88 of the source of liquid coolant and has its discharge end 140 connected by a copper section 142 with the discharge line 96 of the drain. Similarly, the inlet 144 of the section 132 is connected by a copper tube 146 with the liquid coolant feed line 88 and its discharge outlet 148 is connected by a copper connector tube 150 with the drain line 96. Similarly, the section 134 has its inlet 152 connected by a copper section 154 with the liquid coolant feed line 88 and has its discharge outlet 156 connected by a copper conductor 158 with the drain line 96. It will thus be apparent that each section of the housing as well as the current conducting end supports of the element 12 are provided with heat exchange devices for conducting heat away from the furnace.

The interior chamber 159 of the housing 36 is connected by a pipe line 160 with a series arranged vacuum pump 164 and a diffusion pump 166 through a shutoff valve 162, trap 163 and pipe 168. A vacuum gauge 167 such as a cold cathode ionization type is provided in the section 168 of the pipe line between the valve 162 and the diffusion pump 166 and is controlled by a valve 169. When the valve 162 is open it is possible to exhaust the air from within the chamber 159 and to operate the diffusion pump 166 for conveyng the gases out of the furnace to a lower pressure than the vacuum pump alone could attain. The pipe line 160 is likewise connected by a pipe 170 through a valve 172 with a source 174 of inert gas such as helium, argon or nitrogen. To indicate the pressure in the line 170 we provide a manometer or pressure gauge 176 which is connected by a pipe 178 through a valve 180 with the pipe section 170. Means for venting the chamber 159 to atmosphere is provided by a valve 181 connected by a pipe 182 to the pipe line 161 between the chamber 159 and the valve 162.

Interiorly of the element 12 is preferably provided a metal base or coupling 200 secured preferably by welding to the base 46 of the housing and on which is supported a graphite pedestal 202 having an end portion 203 of reduced section which fits within the metallic support 200. The upper end of the pedestal 202 preferably has a bore 206 forming a rim seat 208 for supporting a graphite crucible or melt pot 210 in which is placed an excess amount of high boiling point metal 212 with which the object to be treated, will be coated. As seen in FIGURE 1, there is provided an object 214 such as a graphite crucible whose interior surface is to be treated in accordance with the process of this invention and whose size is preferably though not necessarily just under that of the interior of tube 12. As shown, the crucible 214 is seated in inverted position with its lip portion resting upon the upper lip of the metal containing crucible 210. Positioned adjacent to the upper end of the object 214 is a suitable radiation shield 220 or several such shields, one above the other, preferably of tantalum metal. The shield 220 preferably fits with slight clearance the interior of tube 12 to thereby effectively reduce radiant heat loss from section 14 of the tube and from the top of crucible 214. The shield 220 is provided with a central opening 232 through which the upper end of the object 214 will be visible by means of an optical pyrometer generally designated by the number 234 through a viewing piece generally designated by the number 235. The viewing piece may be an elongated tubular extension 238 of the cover 32 or may be a separate tubular structure attached to the latter and of minimum size at the cover 32 and maximum size at the viewing end. The viewing piece 235 has a heat resisting window 236 suitably mounted and sealed therein by rubber gaskets 239 between a flanged portion 240 and a bezel 241 through bolts and nuts 242. As seen, the bezel 241 and flange portion 240 may be recessed as at 243, 244 to receive the window and gaskets, the lower one of which is preferably an O-ring. By means of the window, visible observations of the temperature existing in the working area of the element 12 will be determinable. It is to be noted that the pedestal 202 is made of such height as to bring the metal containing crucible 210 and the object to be coated within the area of the reduced section zone 22 of the heating element 12.

In some instances it may be desirable to treat all surfaces of the object. Two illustrated arrangements for accomplishing this result are shown in FIGURES 2 and 3.

In FIGURE 2 the object 214 as in FIGURE 1, is a graphite crucible. In FIGURE 2 the object is shown supported by an adaptor 250 having a circular rim coinciding with and seating on the upper rim of the metal containing crucible 210. The object here loosely seats on a plurality, for example three, equally spaced circumferentially knife-edge radial fingers 252 and is enclosed by a tubular hood 256 whose rim portion loosely seats on the circular rim of the adaptor 250. The metal vapor may rise in the spaces between the radial fingers 252. The adaptor and hood will preferably be of graphite or other refractory material. If desired, the object 214 may be hung by a wire or other support from a bar 257 in which case the adaptor may be omitted. In either event, escape of gases during heating is by way of the loosely fitting seats.

In FIGURES 3 and 4, the object 214A to be treated is a solid cylindrical or other shaped solid block of carbon suspended by suitable means immediately above the carbide forming metal 212 in the crucible 210A. Of necessity, the crucible 210A in these figures will be of greater depth than the crucible 210 of FIGURES 1 and 2 and may also be of greater diameter so as to extend over pedestal 202. In FIGURE 3, the object 214A is supported from a loosely fitting cover 260 by one or more coaxial graphite rods 264 provided with external threaded portions 266. Two coaxial rods are shown connected by a threaded carbon coupling sleeve 268. The lower rod 264 is threaded into a threaded bore 265 in the block 214A and the upper rod 264 is loosely threadedly received in a threaded bore 263 of the cover 260. By means of one or both of the rods 264 objects of various size may be properly suspended in the crucible. The cover 260 may be provided with one or more holes 262 which may serve as gas escape ports during heating or to receive object supporting wires 258 which as seen in FIGURE 4 replace the rods 264 as a means of support for object 214A, the wires 258 in this figure preferably being of tantalum and passing through the loosely fitting holes 262 of the cover 260a.

One or more suitable heat reflector shields may be provided immediately over the object 214A to reflect heat back to the bottom hotter portion of the crucible 210A and to the object 214A, thus facilitating the provision of a more uniform temperature in the zone containing metallic vapor. Such shields will also contribute to retention of metallic vapor in the vicinity of the object 214A and will minimize the escape of such vapor to the colder top portions of the furnace or to the vacuum system.

In FIGURE 3 a pair of shields 270 are shown threadedly received over the lower rod 264 and their positioning may also be aided by a second threaded sleeve 268. In FIGURE 4 the shields 270a are carried by the support wires 258.

One or more radiation shields 272 may also be provided in juxtaposition to the top of covers 260, 260a as in FIGURE 1, making minimum contact to minimize thermal radiation losses from the top of crucible 210A and zone 22 of the furnace tube 12.

In FIGURE 5 there is shown a further modification of the apparatus of the present invention, the same differing from that in FIGURE 1 in that the resistance path provided by the cylinder 12 in FIGURE 1 for the electric power is here omitted and the power is passed directly through the object to be treated and the crucible containing the metal coating material. As shown in FIGURE 5, there is provided at the top and bottom of the furnace, solid graphite electrodes or pedestals 300 and 302 which seat against the metal ferrules 24 and 26 respectively, which in turn are carried by the resilient coils 28 and 30 respectively, these pedestals receiving between them in lightly clamping electrical relation the metal containing crucible of FIGURES 3 and 4 or, as shown in FIGURE 5, the coaxially and tandem arranged metal containing crucible 210 and a cup-like object, for example, a crucible 214 which is to be coated on the inside face as in FIGURE 1. The upper pedestal 300 preferably has a central bore 303 through which and the window 236, observations may be made by a pyrometer 234 of the temperatures prevailing in the furnace. As shown, the ends of the pedestals 300, 302 in juxtaposition to the ferrules 24 and 26 respectively, are tapered to conform to the conical shaping of the ferrules.

Where intense heat is to be encountered which may cause breakage of the glass window 236, a window such as shown in FIGURE 6, may be employed and which as shown, comprises a glass pane 236 of heat resisting glass supported in a manner similar to the window 236 in FIGURE 1 with this difference that the lower O-ring 239 when compressed is of sufficient section to space the window 236 away from the face of the lower recess 244 a sufficient distance to receive and clamp two thin layers 245 of heat absorbing glass and a bottom thin metal disc 246 of aluminum or other metal, preferably of low emissivity, the metal disc being provided with a central sight hole 247. The use of the metal disc will greatly reduce breakage of glass 236 due to combined thermal and mechanical stresses and the addition of the two thin layers of glass above the metal disc appears to eliminate breakage entirely.

Preferably surrounding the heating area 306 in FIGURE 5 and arranged in relatively close proximity to the exterior surfaces of the upper and lower pedestals are a plurality of concentric radiation shields 70a, 72a and 74a, the inner pair of which is preferably made of molybdenum, for example sheet molybdenum, of about .002" thickness and the outer one likewise of molybdenum or stainless steel depending upon the temperature to which the furnace is to be raised.

It will be evident that in the FIGURE 5 arrangement the current conducted to the ferrules will pass between the electrodes 300, 302, crucible 214 to be treated and metal-containing crucible 210 as well as the metal 212 which may for example be a coating metal such as zirconium. In this arrangement, the pedestal 202 of FIGURE 1 is not used since the electrode 302 is recessed at its lower end to provide bore 308 to be received over the fixed pedestal 200. In this instance, however, no support is provided by the pedestal 200 since the recess is larger than the pedestal 200, the arrangement being made for the purpose of flexibility such that the furnace may be operated in the manner shown in any of FIGURES 1 through 5. It will be understood that the radiation shields 70a, 72a, and 74a may be suitably interconnected by short rivets 76 as in FIGURE 1, and suitably supported at the base of the casing 126 in a manner for example as shown in FIGURE 1, or by suitable supporting straps or brackets to the casing 36. The advantage of the construction in FIGURE 5 is that no elongated resistance tube 12 is required and there is believed a more efficient confinement of heat at the object and metal-containing crucible making possible temperatures over 5000° F. It also facilitates handling of large objects. The arrangement is however susceptible to the possible disadvantage that the top pedestal 300 which also serves as an electrode must be pulled out to remove the object being coated and there is some tendency to cause deleterious local overheating due to poor or uneven electrical contact of the object to be coated, whereas in the arrangements of FIGURES 1 through 4 the heating is by radiation only.

Still higher furnace temperatures for instance 6500° F. and greater may be obtained by the arrangement shown in FIGURE 7 wherein a treating chamber may be formed between solid electrodes 300a and 302a by a metal shield 310 preferably of thin tantalum metal suitably mounted in receiving grooves 312, 314 in the electrodes. In this manner the shield becomes part of the electrical circuit and may define a space in which to place a metal-receiving crucible and in which to support in any suitable manner the object to be coated, means being provided for removing escaping gas and for effecting suitable vacuum conditions, as by holes 316. If desired, the crucible and object, for example as shown in FIGURE 5, may be part of the power circuit, and the structure may also provide for one or more additional shields such as the shields 70a, 72a and 74a of FIGURE 5.

Since the ability of the resistance tube or heater 310 to withstand heat will among other factors determine the temperature to which the furnace may be heated such heat resistance may be fortified by the processes of the invention by first subjecting the metal tube 310 to a carburizing treatment as by treating the tantalum with methane and then as in the present invention subjecting the carburized surface to treatment by a vaporized metal per se to produce a heat and corrosion resisting metal carbide facing or barrier 318 on the inner side of the shield as in FIGURE 8. Alternatively, the resistance element 12 of FIGURE 1 and the tube 310 of FIGURES 7 and 8 and shields 70a, 72a, 74a, of FIGURE 5 may be of carbon, treated in accordance with the present invention to produce a metal carbide barrier and layer on the inner side of these structures which metal carbide layer may serve as a means for bonding to the carbon structure another metal tube or layer.

In operation of the furnace 10 the object to be carbide treated, for example, a crucible 214 made of a carbon material such as graphite which is preferably pure and free of volatile materials such as hydrocarbons, is placed in the vacuum furnace such as shown in FIGURE 1 in an inverted position over another crucible 210. The bottom crucible 210 contains a preselected metal 212 to be vaporized and deposited upon the interior surface of the top crucible 214. The bottom crucible will also preferably be of purified graphite free of volatile materials, but this is not essential.

The furnace 10 is then sealed so that it will hold a vacuum. Valve 92 is opened to permit flow of coolant water to the coils covering the casing and head of the furnace and to flow to the drain 100. The mechanical vacuum fore pump 164 is actuated and permitted to operate for several minutes or until the pressure at the inlet to the diffusion pump 166 reads about 500 microns of mercury absolute or less on a McLeod or thermocouple gauge (not shown) on the same line as the ion gauge 167. Heat is then turned on the boiler of the diffusion pump and the vacuum system allowed to pump the furnace down to an absolute pressure preferably in the range of 1 to 10 microns readable on the gauge 167. It is generally found that a lower pressure than one micron is not needed and it is preferred to get down to 10 microns or less in order to remove most of the air from the furnace so that the air will not react with the metal to be vaporized and so hinder vaporization of the metal or contaminate the finished carbide coat.

As soon as the system is pumped down to 1 to 10 microns, the power supply is connected to the local power distribution feeder, for example, a 208 volt, single phase alternating current system. About 30 volts of direct current is then applied to the saturable core reactor (not shown) in the power supply system, thus allowing current to flow through the reactor and through the isolation transformer (also not shown) which is in series with the reactor. The secondary of the isolation transformer is connected through large wires to the furnace at 60 and 62 so that currents up to about 2500 amperes can be carried at voltages up to about 10 volts.

The current is now allowed to flow through the furnace at a relatively low rate until outgassing of the crucibles, metal, and furnace parts subsides to low rates. The outgassing is usually substantially complete by the time the furnace has reached a temperature between 2000–2500° F. If the grades of graphite used aforesaid are such as to contain considerable volatile matter, it can take as long as an hour to heat a thirty or forty gram graphite crucible of such material to 2000–2500° F. without exceeding a pressure of 25-50 microns at the diffusion pump inlet. On the other hand, if certain kinds of graphite, for example a spectroscopic electrode grade of low volatile content, are used, a whole furnace tube weighing about 400 grams can be subjected to full power in one step without releasing enough gas to raise the pressure at the diffusion pump by more than a few microns, for example, 5 to 10 microns for a few seconds, for example 30 seconds.

It is preferred to complete the outgassing step at low temperatures to minimize reaction of the gases with the metal to be used as a coating. It is also preferred to complete outgassing at a temperature below the melting point of the metal so that the metal is not reacted with outgassed materials and also so that any release of gases by the metal upon melting can be observed.

Once outgassing has been completed as evidenced by a steady pressure of about 1 to 5 microns, power is applied to the furnace by increasing the direct current voltage on the saturable reactor until the metal and object are heated to a temperature at which the metal will vaporize (at which time the absolute pressure of the environment will be substantially less than the vapor pressure of the metal at its heated temperature). At about 10 volts A.C., for example, the furnace tube 12 will reach a temperature of about 4200-4300° F. and more, and the metal in the bottom crucible may reach 3500–4000° F., depending upon how well heat losses are controlled.

The furnace is allowed to run under desired power and predetermined temperature for about ten minutes during which time the metal is vaporized and reacts with the hot object to produce a carbide barrier. When a coating of sufficient thickness has been attained, the power is shut off and the power supply disconnected from the line. The furnace is then allowed to cool. Cooling may require from 20 minutes to 1½ hours depending upon how vigorously cooling is applied and how cool the treated part must be before withdrawal. After the furnace is cool, the valve 162 between the furnace and the diffusion pump is shut, the vent valve 181 opened and air admitted to the furnace. The furnace is then unsealed by removing the top sight glass 236. The treated crucible 214 is then pulled out through the top sight hole. Sometimes the bottom crucible 210 is stuck to the top crucible 214 by a hard layer, thought to be carbide and metal. In that event, both are removed and can be cut apart.

If a cut is objectionable, the entire crucible 214 can be suspended inside a large crucible as in FIGURE 2, FIGURE 3, or FIGURE 4 by tantalum wires or graphite studs. If necessary, the crucible to be treated can be hung first by one end and then by the other so that all holes for wire or for studs or other areas imperfectly coated in the first treatment can be reached by the subsequent treatment.

The following examples will illustrate products made in accordance with the invention utilizing the procedure and apparatus described above:

*Example I*

Using the arrangement of FIGURE 1, a crucible such as the crucible 210 preferably made of pure graphite is placed in the furnace and 5 to 10 grams of titanium sponge placed therein. A crucible such as the crucible 214 of FIGURE 1 and preferably of pure graphite which it is desired to coat on the interior surface, is positioned as shown in FIGURE 1 over the titanium-containing crucible 210 and with their juxtaposed ends in contact with each other. The furnace is then sealed and evacuated by the means previously described to a reading of one micron on the gauge 167. With a crucible to be treated of about 1" diameter and 2" length being coated, this procedure will take between 20 to 25 minutes. The power is now applied to the furnace and for the first two or three minutes, 5 kilowatts of power is fed to the furnace and through the resistance element 12. After this initial period, the power is raised to 18 kilowatts and this is maintained for a period of ten minutes. During this period the temperature of the titanium metal in the crucible 210 will reach a temperature of between 3900–4000° F. and will vaporize to coat the crucible 214 simultaneously heated therewith. Thereafter the power will be shut off and the bottom of the furnace cooled in any suitable manner such as by the application of a wet blanket at the base of the furnace or by means of a blast of compressed air. These cooling aids will permit the vacuum to be broken and the titanium treated object removed in about 20 to 25 minutes following cutoff of power. Examination of the crucible coated, as described, showed a coating of several mils thickness of titanium carbide over its entire interior surface.

*Example II*

Using the arrangement of FIGURE 5, a pure graphite crucible 210 in which was placed 5 to 10 grams of zirconium sponge was arranged in the furnace as shown in that figure, and a crucible of pure graphite to be coated on the inside arranged as shown in inverted position over the zirconium-containing crucible. The furnace was sealed and evacuated to one micron. This procedure required about 20 to 25 minutes. Five kilowatts of power was then turned on the furnace for a period of two or three minutes after which the power input was raised to 19 kilowatts and this amount of power maintained for ten minutes. The power was then shut off and the furnace cooled in the manner described with respect to Example I. This permitted breaking of the vacuum and removal of the zirconium-treated crucible in about 20 to 25 minutes after the power was shut off. During application of full power, the top temperature of the zirconium in the crucible was about 4400–4500° F. The coating when measured showed a thickness of several mils of zirconium carbide over the entire interior of the crucible which, as in Example I, was about 1″ in diameter by 2″ in length and which had been exposed to the zirconium vapor in the manner described.

An important use of the present invention lies in the adaptability of the process to cementing together two pieces of carbon and of forming articles of metal carbides within a metal matrix.

The cementing of two pieces of carbon involves merely placing together the edges to be cemented, and carrying out the metal diffusison in a vacuum furnace, as described previously. During the formation of the metal carbide the pieces are automatically joined together in a strong bond.

Articles of metal carbide can be made by intimately mixing the metal with pure carbon, the metal being in excess. The mixture is then heated in a vacuum furnace in the manner previously described to form hard, tough articles suitable for cutting and abrasive applications. Titanium carbide articles are particularly valuable because of their hardness, a Knoop hardness of about 2500.

This latter operation can be reveresd in that a formed metal object can be carburized in a vacuum furnace to form a metal carbide article. This technique is particularly valuable in the making of resistor elements for furnaces. In this manner temperatures of 6500–7000° F. can be attained in an electrical resistance type furnace.

As indicated above, the invention includes the modification of the metal carbide or exterior metal surface for specific purposes. Thus, metal carbonitrides and metal oxycarbonitrides may be formed. The metal surfaces may also be coated with boron nitride or silicon dioxide.

To form the carbonitrides or oxycarbonitrides the metal is reacted with a formed carbon piece in accordance with the principles of the invention to form a hard, refractory carbide with a surface excess of metal. This surface, while still at elevated temperatures, is contacted with small amounts of oxygen, nitrogen, or mixtures thereof. The resulting surface is useful for rocket tubes, furnace refractories, crucibles, etc. to resist combustion action. Some of the carbonitride and oxycarbonitride surfaces produced are brilliantly colored and lend esthetic appeal to the finished article.

*Example III*

Titanium deposited on a graphite piece in accordance with the principles of the invention was exposed briefly to atmospheric air while at a temperature of about 3750° F. The air was purged away with helium and the graphite part cooled. A uniform, brilliant purple color oxycarbonitride coating resulted.

*Example IV*

The previous example was repeated except that carbon pieces were positioned in a manner to touch each other where it was desired to cement them together. Upon concluding the reaction the parts were firmly cemented together with the joints no longer visible.

Boron nitride coatings on the articles of the present invention give hard finishes with oxidation resistance. A diffusion resistant barrier is first formed on a carbon piece with titanium, zirconium, niobium, tantalum, and the like. The hot surface, at about 3000–4000° F. is then contacted with boron and nitrogen; boron and ammonia; boron trifluoride and ammonia; boron trifluoride and nitrogen, or similar reagents which react to form boron nitride.

Similarly silicon can be vaporized and deposited on the diffusion resistant barrier of a metal carbide; for example, uranium carbide. By controlling the cooling rate of the silicon while admitting oxygen to the vacuum chamber, an impervious film of a silicon oxide can be produced over the silicon metal and over the diffusion resistant barrier. In this manner an improved moderator, reactor structural material, and reactor fuel element material can be produced which is resistant to high pressure, high temperature water, dissociating carbon monoxide, and air at high temperatures.

It will be apparent that the present invention provides for the deposition of a metal (that is, a metal whose vapor pressure is less han ten microns of mercury at about 2000° F.) on other refractory structures such as ceramics or other metals which can withstand the heat of the vacuum furnace.

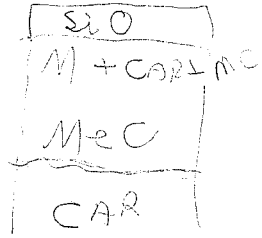

Having thus described our invention, we claim:

1. The method of coating a base refractory material which comprises heating said material to an elevated temperature in a substantially closed vacuum chamber with a metal which has a vapor pressure of less than about ten microns of mercury at about 2000° F., reducing the pressure in said chamber to a pressure less than ten microns of mercury, continuing said heating at a sufficiently high temperature for a period of time sufficient to provide for a buildup of pressure of metal vapor in said chamber to substantially saturation conditions at said high temperature to thereby provide for condensation of said metal on said material.

2. The method according to claim 1 wherein said material is graphite.

3. The method according to claim 1 wherein said metal is titanium.

4. The method according to claim 1 wherein said metal is zirconium.

5. The method according to claim 1 wherein said metal is tantalum.

6. The method according to claim 1 wherein said metal is uranium.

7. The method according to claim 1 wherein said metal is molybdenum.

8. A method for coating a base structure formed of allotropic carbon in a substantially closed vacuum chamber which comprises, placing a metal having a relatively high boiling point and a vapor pressure less than ten microns of mercury at 2000° F. in said chamber in proximity to said structure, reducing the pressure in said chamber to a pressure less than ten microns of mercury, heating said metal to a temperature sufficiently high to effect vaporization thereof, continuing said heating to a sufficiently high temperature for a time period sufficient to provide for a buildup of the pressure of metal vapor in said chamber to substantially saturation conditions at said high temperature to provide for deposition of metal from said vapor on said structure at rates providing for penetration of said metal into said structure before reacting completely therewith to form the carbide of said metal.

9. The method of claim 8 wherein the metal is deposited at vapor pressure greater than 100 microns of mercury.

10. The method of claim 8 wherein the carbon is a porous allotropic form of carbon, the chamber in evacuated prior to heating, the metal is a transition element whose carbide is refractory, the material is heated to a temperature sufficiently high to react the metal vapor with the carbon, and the metal vapor impregnates the material at vapor pressures in the range of 100 to 10,000 microns of mercury to react metal vapor with carbon at the surface and in interstices of the material to form a metal carbide diffusion resistant barrier penetrating into the original surface of the material.

11. The method of claim 8 wherein the metal is a metal in Groups IV to VI of the Periodic Table.

12. The method of claim 8 wherein the metal vapor is deposited on the material for a period of time sufficient to effect diffusion and transition of metal through an initial carbide formation to substantial penetration into the material and form a substantial concentration gradient of barrier material bonded to the carbon base and decreasing in concentration from the original surface into the carbon base.

13. A method using the vapor of a carbide forming metal for manufacturing a porous, allotropic carbon base structure having a surface with barrier material which comprises heating the structure in a vacuum to an elevated temperature to outgas the structure, further heating the structure under vacuum in an inert atmosphere in the presence of the metal to a temperature sufficiently high for a sufficient time period to provide for quantities of said metal vapor adjacent said base structure approaching saturation conditions at said temperature, impregnating the structure with said metal vapor to react said metal vapor with carbon at the surface and in interstices of the material to form a concentration gradient of metal carbide barrier material into, and bonded to, the surface of the structure, and cooling the structure to non-reactive temperatures.

14. The method of claim 13 wherein the elevated temperatures employed during outgassing are below the melting point of the metal, the inert atmosphere is an inert gaseous atmosphere, the metal is a transition element whose carbide is refractory, the metal vapor impregnates the structure at vapor pressures in the range of 100 to 10,000 microns of mercury, and the structure is impregnated with metal vapor for a period of time sufficient to effect diffusion and transition of the metal through an initial carbide formation to substantially penetrate into the original surface of the structure and form a substantial concentration gradient of diffusion resistant barrier material decreasing in concentration from the original surface into the carbon structure.

15. The method of claim 13 wherein the elevated temperatures employed during outgassing are below the melting point of the metal, the inert atmosphere is a vacuum, the metal is a transition element whose carbide is refractory, the metal vapor impregnates the structure at vapor pressures in the range of 100 to 10,000 microns of mercury, and the structure is impregnated with metal vapor for a period of time sufficient to effect diffusion and transition of the metal through an initial carbide formation to substantially penetrate into the original surface of the structure and form a substantial concentration gradient of diffusion resistant barrier material decreasing in concentration from the original surface into the carbon structure.

16. The method of claim 15 wherein the structure is outgassed to a temperature between 2000 to 2500° F. and an absolute pressure in the range of 0.01 to 10 microns of mercury for a period of time sufficient to outgass all volatile substances from the structure, and the structure is a graphite structure.

17. The method of claim 16 wherein metal vapor is deposited on the impregnated graphite structure for a sufficient time to produce an overlay essentially of pure metal.

18. The method of claim 16 wherein the structure is heated to a temperature sufficiently high to react with the metal vapor, effect distribution of the vapor with substantial penetration into the structure and redistribute metal revaporized.

19. The method of forming a diffusion resistant barrier on the surface of a carbon base structure comprising placing said base structure in a substantially closed vacuum chamber, placing a carbide forming metal from the group consisting of titanium, zirconium, tantalum, uranium, niobium, vanadium and thorium in said chamber in proximity to said base structure, heating the structure in a vacuum in an inert atmosphere to a temperature below the melting point of the metal for a time period sufficient to outgas the structure, further heating the said structure and the metal to a temperature sufficiently high to vaporize said metal while maintaining a pressure in said chamber of less than ten microns of mercury, continuing said heating at said sufficiently high temperature for a time period sufficient to provide for substantially saturation conditions of said vapor at said temperature so that metal from said vapor is deposited on said structure and at least some of said metal reacts with said carbon to form the carbide of said metal and at least some of said metal penetrates into said structure, and cooling said structure to non-reactive temperature.

20. The method of claim 19 wherein the diffusing and reacting is continued for a sufficient time to produce an overlay essentially of pure metal.

21. The method of forming a diffusion resistant barrier on the surface of a carbon base structure comprising placing said base structure in a substantially closed vacuum chamber, placing titanium metal in said chamber in proximity to said base structure, heating the structure in a vacuum below about fifty microns of mercury to a temperature in the range of 2000–2500° F. for a time period sufficient to outgas the structure, further heating the said structure and the metal to a temperature of about 3900–4000° F. to vaporize said metal while maintaining a pressure in said chamber of less than ten microns of mercury, continuing said heating at said last-mentioned temperature for a time period sufficient to provide for substantially saturation conditions of said vapor at said last-mentioned temperature so that metal from said vapor is deposited on said structure and at least some of said metal reacts with said carbon to form the carbide of said metal and at least some of said metal penetrates into said structure, and cooling said structure to non-reactive temperature.

22. The method of forming a diffusion resistant barrier on the surface of a carbon base structure comprising placing said base structure in a substantially closed vacuum chamber, placing zirconium metal in said chamber in proximity to said base structure, evacuating said chamber to a pressure of less than ten microns of mercury, heating the structure while maintaining said vacuum to a temperature below the melting point of the metal for a time period sufficient to outgas the structure, further heating the metal to a temperature of about 4400–4500° F. to vaporize said metal while maintaining a pressure in said chamber of less than ten microns of mercury, continuing said heating at said last-mentioned temperature for a time period sufficient to provide for substantially saturation conditions of said vapor at said last-mentioned temperature so that metal from said vapor is deposited on said structure and at least some of said metal reacts with said carbon to form the carbide of said metal and at least some of said metal penetrates into said structure, and cooling said structure to non-reactive temperature.

23. The method of cementing together two pieces of carbon which comprises positioning the pieces in a vacuum furnace such that the edges to be cemented lie against each other, heating said pieces at an elevated temperature under vacuum with a metal having a vapor pressure of less than ten microns of mercury at about 2000° F., and continuing the heating for a sufficient length of time at a sufficiently high temperature to vaporize said metal, and contacting the surfaces of said carbon pieces at said edges with the vapor of said metal so as to form a carbide of said metal extending between said edges.

24. An article of manufacture comprising an allotropic carbon body having a metal selected from the group consisting of zirconium, tantalum, titanium, uranium, hafnium, thorium, vanadium, molybdenum, and niobium soaked a substantial distance into a surface thereof so that at least part of said metal is reacted with said carbon body to form a carbide of said metal, the concentration of said metal and metal carbide decreasing in a direction into said body from said surface.

25. The article of claim 24 wherein the allotropic carbon is graphite.

26. The article of claim 25 wherein the metal is titanium.

27. The article of claim 25 wherein the metal is zirconium.

28. The article of claim 25 wherein the metal is tantalum.

29. The article of claim 25 wherein the metal is uranium.

30. The article of claim 25 wherein the metal is molybdenum.

31. An article according to claim 25 which has a further coating thereon of silicon.

32. An article according to claim 25 which has a further coating thereon of a silicon oxide.

33. The article of claim 25 which contains a layer of a transition metal whose carbide is refractroy bonded to and on top of the barrier.

References Cited by the Examiner

UNITED STATES PATENTS

| | | | |
|---|---|---|---|
| 2,113,171 | 4/1938 | Cooper | 29—182.2 |
| 2,499,977 | 3/1950 | Scott | 117—107 |
| 2,614,947 | 10/1952 | Heyroth | 117—106 |
| 2,790,840 | 4/1957 | Simnad et al. | 13—31 |
| 2,848,523 | 8/1958 | Hanks et al. | 13—31 |
| 2,876,139 | 3/1959 | Flowers | 117—106 |
| 2,884,894 | 5/1959 | Ruppert et al. | 117—106 |
| 2,911,319 | 11/1959 | Peter | 117—46 |
| 2,922,722 | 1/1960 | Hutcheon | 117—46 |
| 2,972,556 | 2/1961 | Vrahiotes et al. | 117—106 |

ALFRED L. LEAVITT, *Examiner.*

RICHARD D. NEVIUS, W. L. JARVIS,
*Assistant Examiners.*